United States Patent [19]
Thomas et al.

[11] 4,236,909
[45] Dec. 2, 1980

[54] PRODUCING GLASS SHEETS HAVING IMPROVED BREAK PATTERNS

[75] Inventors: Dean L. Thomas, Glenshaw; Robert G. Frank, Murrysville; George R. Claassen, New Kensington, all of Pa.

[73] Assignee: PPG Industries, Inc., Pittsburgh, Pa.

[21] Appl. No.: 40,603

[22] Filed: May 18, 1979

[51] Int. Cl.³ .............................................. C03B 27/04
[52] U.S. Cl. ...................................... 65/115; 65/348; 65/351
[58] Field of Search .................. 65/118, 115, 348, 351

[56] References Cited

U.S. PATENT DOCUMENTS

| | | | |
|---|---|---|---|
| 2,093,040 | 9/1937 | Eckert | 65/114 |
| 2,177,324 | 10/1939 | Long | 65/115 |
| 2,188,401 | 1/1940 | Crowley | 65/348 X |
| 2,959,836 | 11/1960 | Hanley | 25/142 |
| 3,251,670 | 5/1966 | Acloque | 65/115 |
| 3,304,166 | 2/1967 | Boland | 65/273 |
| 3,363,936 | 1/1968 | Baker | 296/84 |
| 3,364,006 | 1/1968 | Newell et al. | 65/348 |
| 3,396,001 | 8/1968 | Baker | 65/115 |
| 3,847,580 | 11/1974 | Misson | 65/25 A |
| 3,986,856 | 10/1976 | Fournier et al. | 65/114 |

Primary Examiner—Arthur D. Kellogg
Attorney, Agent, or Firm—Dennis G. Millman; Edward I. Mates

[57] ABSTRACT

Producing glass sheets having improved break patterns over those produced either by typical heat strengthening procedures or by heating to a tempering temperature followed by natural cooling.

9 Claims, 9 Drawing Figures

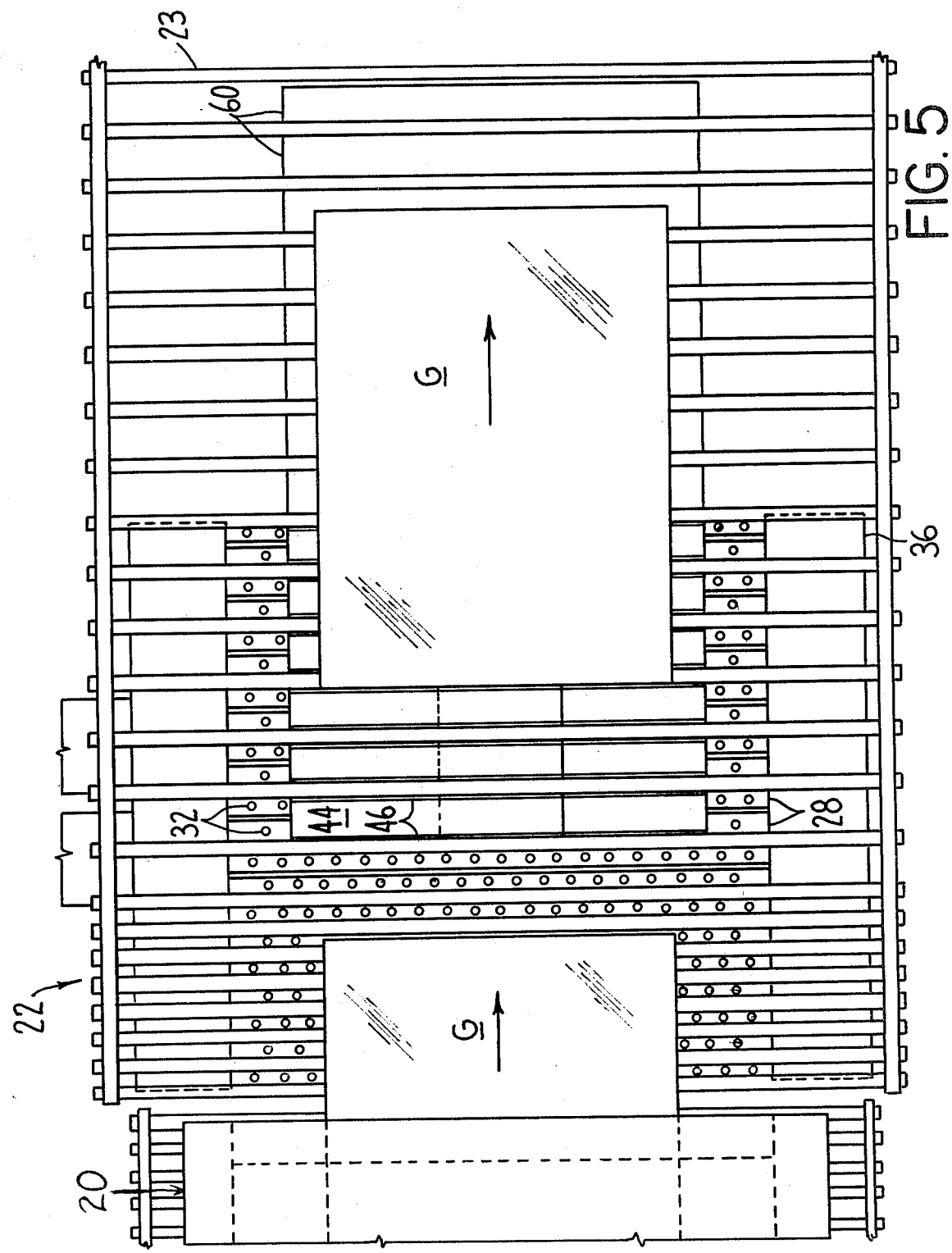

PRODUCING GLASS SHEETS HAVING IMPROVED BREAK PATTERNS

BACKGROUND OF THE INVENTION

1. Field of the Invention

The present invention relates to thermal treatment of glass sheets to provide a break pattern that represents an improvement over the typical break patterns that are produced when glass sheets are either tempered or heat strengthened by conventional techniques of heating to above the strain point of the glass and a temperature sufficient for tempering followed by cooling at a controlled rate of cooling or are heat treated by heating the glass sheets to a temperature sufficient for tempering followed by natural cooling.

It is well known that when glass sheets are subjected to a thermal treatment consisting of heating followed by rapid cooling, that the glass sheets develop a temper. The degree of the temper depends upon the elevated temperature to which the glass sheets are heated and the rate of cooling from the elevated temperature to below the strain point of the glass. Tempered glass sheets develop a compression stress zone in their edge and surface portions that surround an interior portion stressed in tension. Since glass is extremely strong in compression and extremely weak in tension, as long as any mechanical or other force applied to the tempered glass is insufficient to overcome the compressive stress at its surface or edge portion, tempered glass resists breakage. However, when glass sheets that are tempered do fracture, they form relatively small particles that separate readily from a frame in which the window is installed in a building. Fragments dropping onto a pavement below the window are dangerous to passersby.

When fabricating windows for skyscrapers, considerable breakage has occurred. Glass sheets that are heat strengthened in an attempt to provide at least a partial temper, when broken due to stresses resulting from mechanical or heat forces applied locally to portions of a heat strengthened window, develop a break pattern. Under certain conditions, the break pattern provides a line of breakage that is almost continuous to from one or more discrete areas inward from the frame that supports the window. Large pieces of glass within said frame sometimes separate from the window and fall onto the sidewalk below.

Uncontrolled tempering of glass sometimes causes glass warpage which results in mechanical stress during and after installation. Inducing a partial temper by controlling heating and/or cooling has been used to develop windows that are warped a minimum amount so that they can be installed without excessive stresses within a window frame. However, under some circumstances, certain heat strengthened glass sheets have fractured in the past, and the resulting break pattern provided at least one large piece that fell out of the remainder of the window installed within an installation frame.

Attempts to develop a better breakage pattern that does not result in a breakage line enclosing a discrete area spaced inward from the installation frame is generally associated with providing heat strengthened glass sheets that have a lower stress pattern than tempered glass. A suggested method of producing a lower stress pattern involves a slower rate of forced cooling, even to the point of letting the glass cool naturally. It has been found that under some conditions such naturally cooled glass also develops a break pattern that includes a break line surrounding a discrete area of rather large dimensions that tends to break away from the remainder of the glass sheet. Reducing the rate of applying air to the opposite surfaces of the heated glass sheets reduces the stress in the glass but, because the stress reduction is insufficent, fails to avoid the break pattern that includes discrete areas likely to fall on people walking in the vicinity of skyscrapers.

Prior to the present invention, a need existed for a window which would be retained within an installation frame when it developed cracks and a method for making a window having a break pattern that insured the likelihood of such an event that would avoid the dropping of large pieces from windows onto pedestrians below a building in which the window is installed. Generally, glass sheets were rendered less susceptible to thermal breakage and to edge damage during handling and installation by imparting a high edge compression stress to the glass. However, glass sheets thermally treated to have a high edge stress also had a steep surface compression gradient throughout the extent of the glass sheets. The prior art did not fully appreciate the correlation of a steep surface compression stress pattern with a poor break pattern.

2. Description of the Prior Art

U.S. Pat. No. 2,093,040 to Eckert teaches a two step method of tempering glass sheets in which the glass sheets are initially chilled as rapidly as possible to a temperature which lies at or near or somewhat below the annealing temperature of the glass, i.e., that temperature below which temporary stresses are mainly developed. According to this patent, further cooling is accomplished at a slower rate, but one that is still more rapid than a natural cooling rate in an open air environment.

U.S. Pat. No. 2,188,401 to Crowley discloses apparatus for tempering glass sheets in which a plurality of rotatable shutters are interposed between upper and lower sets of nozzles to insure that the entire length of a glass sheet is cooled from the same instant at the beginning of a cooling step as all other portions of the sheet so as to minimize the danger of warpage or breakage of the sheet during its fabrication.

U.S. Pat. No. 3,251,670 to Acloque interposes a disc or a donut-shaped member between tempering nozzles and a portion of the glass sheet to be provided with less temper than the remainder of the sheet in a technique for differentially tempering glass sheets. Other patents showing deflectors or angle bars interposed between a source of pressurized air and the opposite major surfaces of a glass sheet to be differentially tempered include U.S. Pat. Nos. 3,363,936 and 3,396,001 to Baker and U.S. Pat. No. 3,364,006 to Newell et al.

Furthermore, U.S. Pat. No. 3,304,166 to Bolland discloses the use of screens for reducing the rate of flow from high pressure air blasting members against a localized portion of a glass sheet to be tempered to a lower stress than the remainder of the sheet during differential tempering.

U.S. Pat. No. 3,847,580 to Misson discloses a two step cooling method for tempering glass sheets while supported on a gaseous hearth. During the first step, the glass is supported and chilled rapidly until both its center plane temperature and its surface temperature is reduced below the strain point of the glass. During the second step, the glass is supported and cooled by relatively lower volumetric flows of cooling gas per unit of surface support area to maintain the temper initially imparted during the first step. The total power consumption for this two stage tempering process is less than that required for conventional tempering in which the high rate of cooling is maintained throughout cooling.

Other patents reported in a novelty search report include U.S. Pat. No. 2,959,836 to Hanley which was cited for showing a plurality of valves or dampers provided to control the air volume exhausted from a cooling section of a glass heat treating apparatus, and U.S. Pat. No. 3,986,856 to Fournier et al. recited for disclosing a glass sheet treatment apparatus in which the application of air is interrupted when there is no workpiece facing air delivery apparatus.

SUMMARY OF THE INVENTION

The present invention provides a method and apparatus for improving the break pattern of heat treated glass sheets, particularly those that are sufficiently large to be installed in window openings whose minimum dimension is on the order of 24 inches (60 cm) and whose maximum dimension is more than 8 feet (244 cm). The present invention has been used to heat treat glass sheets having a width ranging from 24 inches (60 cm) to 78 inches (198 cm) and a length ranging from 60 inches (152 cm) to 97 inches (247 cm). These glass sheets have nominal thickness of ¼ inch (6 millimeters).

Glass sheets are heated while conveyed through a tunnel-like furnace and passed into a cooling station where they are subjected to opposing pressurized blasts of tempering medium applied at a rate and at a temperature such as to force cool the glass sheet at a more rapid rate than its natural rate of cooling in a fully exposed condition to ambient air in the absence of pressurized blasts. After a brief interval of forced cooling, the glass sheets are moved between closely spaced baffle means that form continuous walls to retard the glass cooling to below the natural cooling rate of the glass. While the sheet major surfaces pass between the walls that face said major surfaces, the edge surfaces of the sheets are exposed to the space between the walls. The inhibited rate of cooling is continued until such time as the glass sheets develop a lower and a more uniform surface compression stress pattern than naturally cooled or force cooled glass such that, when the sheets are installed in an installation frame, their break pattern does not form one or more discrete areas enclosed within a line of breakage from which the portion interior thereof can break away from the secured marginal portion of the glass sheet and fall onto a street below the building in which the installation is made. At the same time, the compression edge stress imparted to the glass sheets during the forced cooling is affected to a lesser amount than the surface compression stress during the time the glass sheet faces the closely spaced baffle means that comprise the closely spaced, essentially continuous walls.

Apparatus for developing the improved break pattern comprises a conveyor extending through a tunnel-like furnace and a cooling station disposed in end to end relation. The cooling station is provided with opposed sets of nozzles and means to apply blasts of tempering medium under pressure through said nozzles at a rate sufficient to force cool the glass at a rate greater than the natural cooling rate in the upstream portion only of the cooling station. The path of travel between the sets of nozzles as defined by the conveyor continues between spaced baffle means forming continuous walls adjacent to the ends of the nozzles. The baffle means are arranged in closely spaced juxtaposition to the opposite major surfaces of the conveyed glass sheet so as to inhibit the natural rate of cooling of the glass sheets in the direction of their major surfaces but have less effect on the cooling rate along the edge surfaces of the glass sheets. The portion of the path wherein the glass moves between the sets of nozzles in fully exposed relation to the blasts is relatively short and the portion of the path extending between the baffle means is relatively long. In this manner, each glass sheet when it leaves the enclosed region at the downstream end of the baffle means has a more uniform surface compression stress pattern and also has an overall smaller surface compression stress within its edge portion than the same glass sheet would have if it were permitted to cool normally from its exit from the furnace through and beyond the cooling station.

It has been found that this disclosed method results in glass sheets having the break pattern desired. Whenever a glass sheet that is installed shows a crack, it can be replaced before the observed crack develops into a break pattern characteristic of more highly stressed glass, which break pattern frequently results in glass pieces falling from the marginal portion of the glass sheet installed in a window receiving frame of a building before the break is noticed and before action can be taken to replace a window having a line of breakage. At the same time, since the steps taken to modify the surface compression stress pattern has relatively little effect on the edge compression stress, the glass sheets can be handled and installed with relatively little fear of edge breakage and can withstand thermally developed stresses. It is during and after installation that the installed glass sheet develops surface flaws under thermal or wind load that tend to grow into break patterns. A large portion of these surface flaws do not develop into lines of breakage that enclose discrete areas when the glass sheets are treated according to the present invention.

The benefits of the present invention will be understood more clearly in the light of a description of a preferred embodiment of apparatus designed for the performance of the method of the present invention.

BRIEF DESCRIPTION OF THE DRAWINGS

In the drawings that form part of the description of the present invention and wherein like reference numbers refer to like structural elements.

FIG. 5 is a horizontal cross-sectional view taken immediately above the path of travel for glass sheets through a portion of the apparatus depicted in FIG. 3;

DESCRIPTION OF THE PREFERRED EMBODIMENTS

Figure 1:
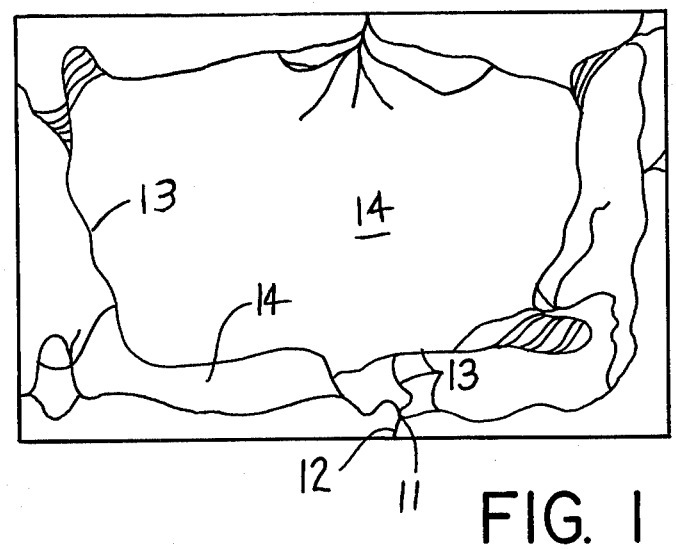
FIG. 1 is a schematic view of a typical break pattern of a glass sheet heat strengthened by a typical prior art method.
Figure 2:
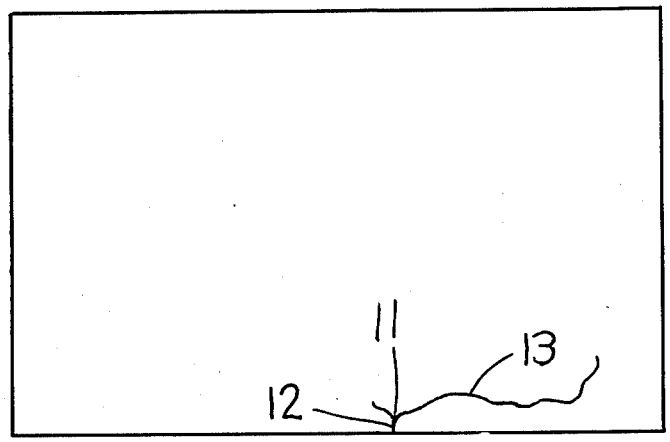
FIG. 2 is a view similar to FIG. 1 of a glass sheet treated according to the present invention, showing the improved break pattern of the glass sheet using the method and apparatus of the present invention.

The benefits of the present invention will be understood more clearly by a comparison of FIGS. 1 and 2. FIG. 1 shows a typical thermal stress-induced break pattern of a glass sheet that has been thermally treated by heating followed by cooling according to the typical prior art method of forced cooling or unretarded natural cooling. The glass sheet of the prior art develops a break pattern that extends from a break 11 irregularly inboard of the periphery of the glass sheet. One or more break lines 12 extend from the break 11 to the edge of the glass. Other branch break lines 13 extend within the sheet to provide one or more discrete areas 14 susceptible of separating from the remainder of the glass sheet. The break pattern depicted in the thermally stressed glass sheet of FIG. 2, which is typical of glass sheets produced according to the present invention, shows a main break 11 provided with a break line 12 leading to an edge of the sheet and an additional branch break line 13 which does not develop to an extent sufficient to form an area enclosed entirely by a break line that makes it susceptible of separating from the remainder of the glass. The glass sheet of FIG. 2 has a relatively low and more uniform surface compression stress pattern compared to that of a sheet that forms the break pattern of FIG. 1 so that when fracture occurs, the break 11 and its extension along break line 12 to the marginal edge and its one or more branch break lines 13 do not develop rapidly to a point where they define an area 14 enclosed by break lines or branch break lines. The development of the break lines into break areas is relatively slow in the sheet of FIG. 2 so that people can notice when a window develops a break pattern so that the window can be replaced in sufficient time before additional external force or stress causes the glass sheet to develop a break area 14 where the area 14 can no longer be held within the frame that receives the window. At the same time, the compressive edge stress is relatively high after such treatment so that thermal load or edge damage and handling is less likely to cause glass edge breakage as is the case with tempered and other heat strengthened glass.

FIGS. 3 to 5 and 9 disclose a typical modification of apparatus for treating glass sheets to develop a relatively low and more uniform surface compression stress profile that provides an improved break pattern in the glass.

The apparatus for developing glass sheets having such a characteristic of more uniform surface compression stress comprises a tunnel-like furnace 20 and a cooling station 22 disposed in end to end relation. A roller conveyor is provided comprising transversely extending longitudinally spaced conveyor rolls 23 that are relatively closely spaced together in the downstream portion of the furnace 20 and the upstream portion of the cooling station 22 and are relatively more widely separated in the upstream portion of the furnace 20 (not shown) and in the downstream portion of the cooling station 22 and therebeyond through a path extension portion 24 downstream of the cooling station 22 to an unloading station where glass sheets G are removed after they are cooled to handling temperature.

The conveyor rolls provide a generally horizontal path of travel for the glass sheets from its upstream end at the entrance to the furnace 20 to its downstream end beyond the path extension portion 24. The furnace 20 is provided with heating elements and the speed of glass sheet movement therethrough is correlated with the furnace length to enable the glass sheets to reach the furnace exit at an elevated temperature suitable for heat strengthening or tempering.

The cooling station 22 comprises upper plenum chambers 27 and lower plenum chambers 28. Each plenum chamber 27 and 28 extends transversely and is longitudinally spaced from its neighbors. Each upper plenum chamber is provided with a transverse row of nozzles 30 extending downward toward the path of glass movement defined by the conveyor rolls 23. Additional nozzles 32 extend upwardly from the lower plenum chambers 28.

The upper plenum chambers 27 extend transversely above the path taken by glass sheets and the lower plenum chambers 28 extend transversely below the path taken by glass sheets and oppose the corresponding upper plenum chambers 27. A series of upper end ducts 34 supply pressurized air to the opposite lateral ends of the upper plenum chambers 27 from a source of pressurized air (not shown). Similarly, a pair of lower end ducts 36 supply air under pressure to the opposite lateral ends of the lower plenum chambers 28 from a source of pressurized air (not shown). The apparatus described thus far represents a conventional glass sheet treatment apparatus designed for heat treating glass sheets. When used in its conventional manner, a series of glass sheets G is conveyed through the furnace 20 where each sheet in turn is heated to a temperature sufficiently high for tempering and the glass is then sprayed with blasts of air applied downwardly through nozzles 30 against the upper surfaces of the glass sheets G and upwardly through nozzles 32 against the lower surfaces of the glass sheets. It will be seen that the nozzles in the apparatus as originally built and used prior to the present invention had the ends of the nozzles 30 and 32 in direct confrontation against the upper and lower major surfaces of the glass sheets G as the latter were conveyed on rotating conveyor rolls 23 through the cooling station 22. The lower nozzles 32 are disposed in spaced relation between adjacent conveyor rolls 23.

According to one embodiment of the present invention, upper baffle means in the form of elongated plates 40 are supported in the downstream portion of the cooling station 22 adjacent the openings of certain upper nozzles 30 and intermediate said certain upper nozzles 30 and the upper surface of any glass sheet passing through the cooling station. Additional upper baffle means in the form of additional plates 41 are provided beyond the downstream end of the cooling station 22. In addition, the apparatus is further modified by lower baffle means in the form of shallow channel shaped members 42 (FIG. 9) extending transversely of the cooling station and having horizontal portions 44 resting over the upper ends of nozzles 32 and flanking depending portions 46 extending downward from the upper horizontal portions 44 of the channel shaped members. The horizontal portions 44 cover the openings of lower nozzles 32 and are sufficiently wide to extend substantially the entire distance between adjacent conveyor rolls 23. The upper baffle plates 40 are supported on a series of rollers 48 rotatably supported in horizontal extensions angled from the bottom of externally threaded shafts 53 vertically displacable with respect to support plates 54 through adjustment nuts 56. Support plates 54 bridge across adjacent upper plenum chambers 27.

The upper baffle means comprise one or more plates 40 that extend longitudinally to form an essentially continuous upper wall that extends a desired distance upstream from the exit of the cooling station. The plates 40 are supported in overlapping relation to one another so as to provide an adjustable continuous width of baffle at least greater than the width of the glass sheets G that move through the cooling station 22. The lower baffle means also provide overlapping channel members 42 whose total length can be adjusted to be greater than the width of the glass sheets G being conveyed through the cooling station 22. The channel members 42 cooperate with the adjacent conveyor rolls 23 in the cooling station 22 to provide an essentially continuous lower wall in the downstream portion thereof. In addition, additional lower baffle plates 43 are provided beneath the extension of the path of glass sheet travel beyond the cooling station 22 in facing relation to the upper additional upper baffle plates 41. The additional baffle plates 41 and 43 are supported in adjustable position on suitable supports. The upper and lower additional baffle plates 41 and 43 are arranged to be slidably positioned relative to their respective support means to provide upper and lower essentially continuous walls of adjustable length and width with no spaces throughout their extent.

Figure 6:
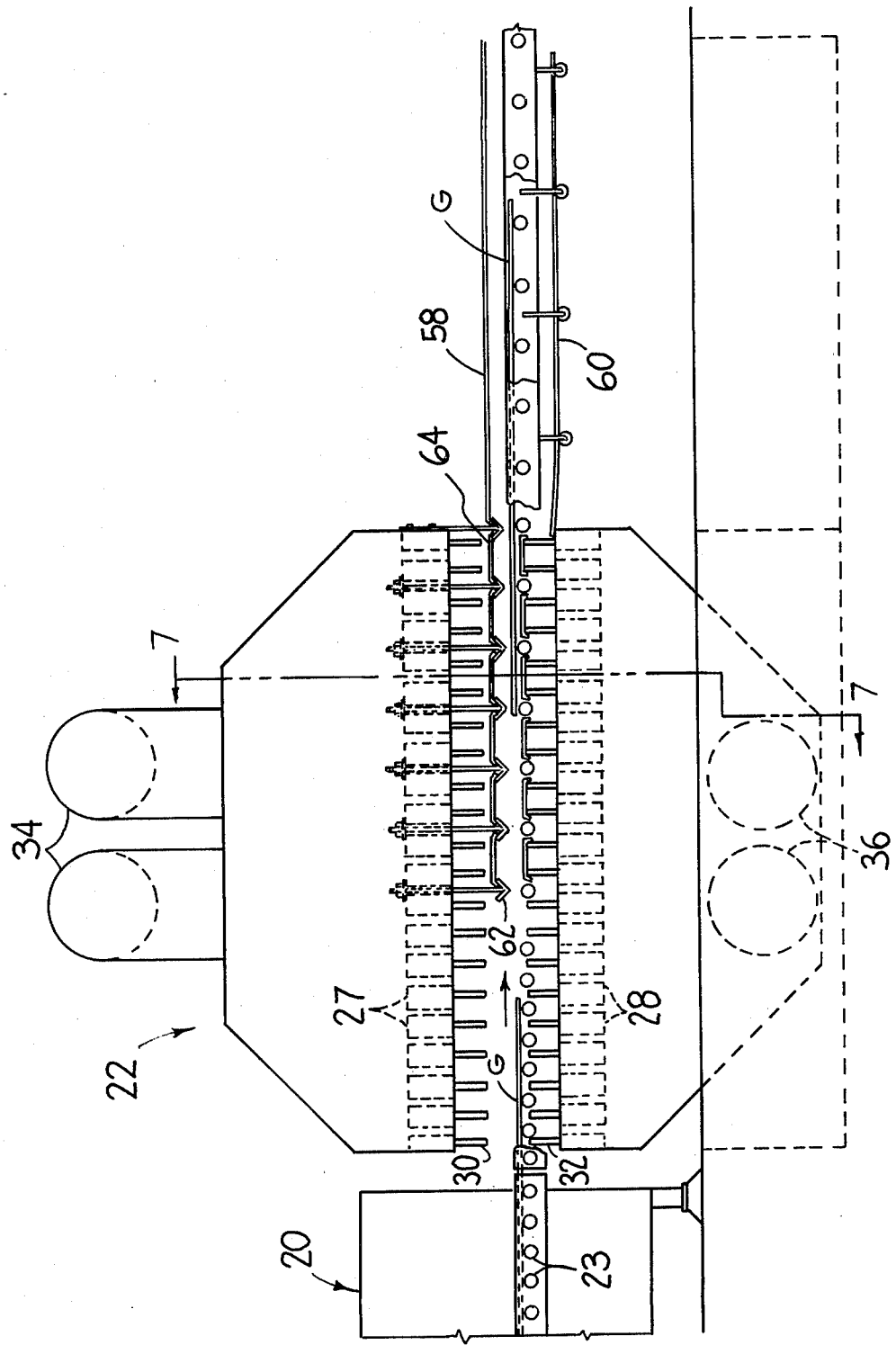
FIG. 6 is a view similar to FIG. 3 of an alternate embodiment of the present invention.
Figure 7:
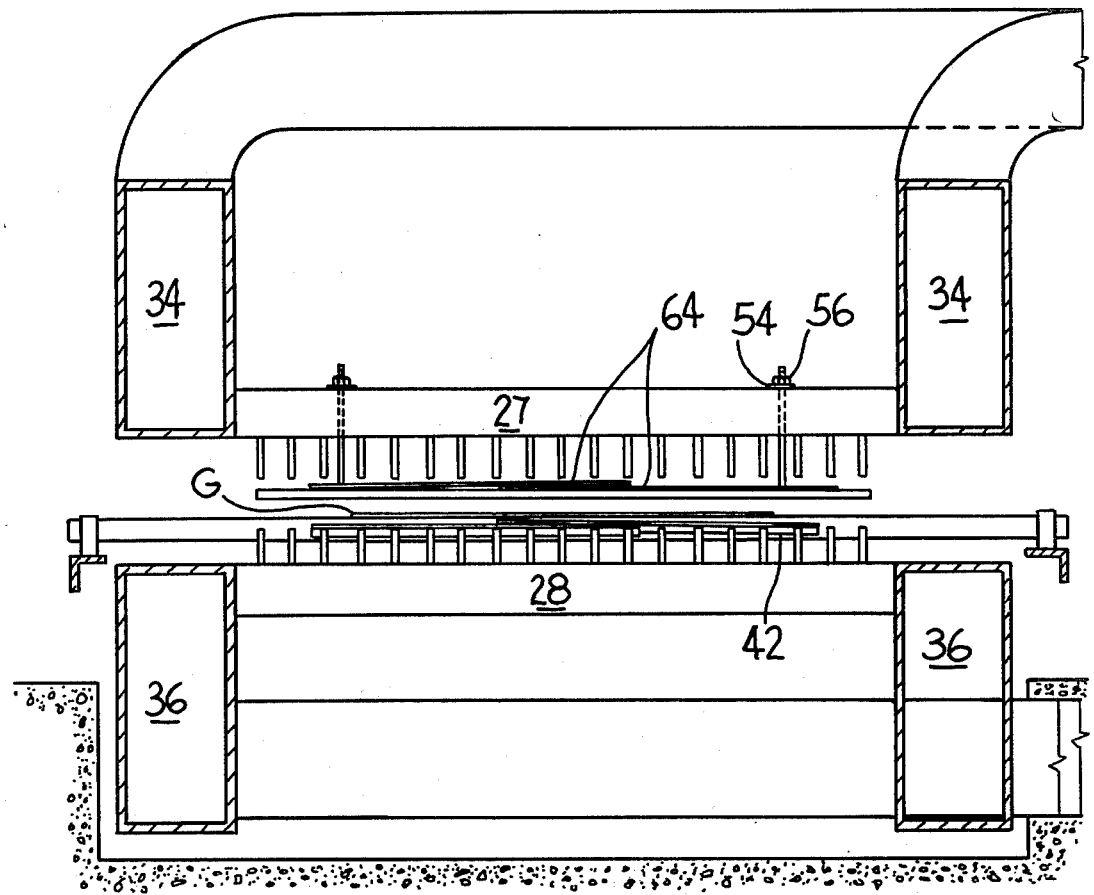
FIG. 7 is a view similar to FIG. 4 taken along the line 7—7 of FIG. 6.
Figure 8:
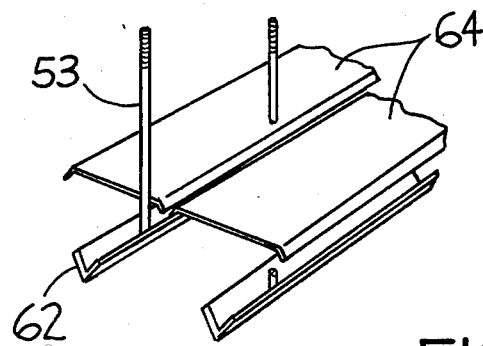
FIG. 8 is a fragmentary perspective view of a portion of upper baffle means and its support structure used in conjunction with the alternate embodiment of the apparatus to form a substantially continuous upper wall.

The alternate embodiment depicted in FIGS. 6 to 8 shows a series of transversely extending grooved members 62 designed for supporting a series of upper baffle plates 64 which are of upside down channel configuration and elongated transversely similar to the configuration of the lower channel shaped members 42 of the first embodiment. The second embodiment also incorporates lower channel shaped members 42 similar to those of the first embodiment to provide lower baffle means. Additional upper baffle plates 58 and additional lower baffle plates 60 are provided beyond the cooling station 22 in the second embodiment, as in the first embodiment and supported in suitable fashion. The additional upper and lower baffle plates 41 and 43 of the first embodiment and additional plates 58 and 60 of the second embodiment provide upper and lower continuous walls closely spaced in a vertical direction from one another to provide a path of narrow vertical height through which glass sheets move between the upper and lower baffle means. Such a narrow vertical height inhibits cooling of the glass sheets in the direction of their major surfaces. The spacing between the upper baffle plates 41 or 58 and the lower baffle plates 43 or 60 provides openings facing the lateral side edges and also some opening facing the leading and trailing edges of the glass sheets moving between the upper and lower baffle plates. The relative exposure of the edges to the space between the baffle plates while the major surfaces face the baffle plates is believed to cause the compression edge stress to be affected to a lesser extent than the surface compression stress, which latter becomes more uniform due to this type of exposure.

In providing the improved break pattern, glass sheets are handled in a similar manner as they are on any roller hearth conveyor. During their traverse through the furnace 20 they are heated till they develop an exit temperature approximating 1185° F. (640° C.). The hot sheets then pass between the upper nozzles 30 and lower nozzles 32 which directly face the glass sheets in the upstream portion of the cooling station 22 to force cool the glass to a temperature slightly above the strain point of the glass. As the glass continues to pass through the cooling station, it is moved into a position facing the upper baffle means 40 in the first embodiment or the upper baffle plates 64 of the second embodiment and the lower baffle means 42 of both embodiments while the side edges face the space between the baffle plates. In this portion of the cooling station, and in the path extension section 24 of the conveyor which defines the path of movement beyond the cooling station 22 where the major glass sheet surfaces face the additional upper baffle plates 41 or 58 and the additional lower baffle plates 43 or 60, the glass sheets have their cooling rate retarded so as to cause the glass to leave the end of the path of glass sheet movement at a higher temperature than that which they would normally attain if they cooled naturally from their exit out of the furnace. It has been found that such forced cooling while the glass sheets traverse approximately 3 to 4 feet of length of the path of travel followed by passing the momentarily force cooled glass sheets between closely spaced baffles to retard the cooling rate for the remainder of the length of the path of the conveyor along the remainder of the length of the cooling station and along the extension of the path of glass sheet travel beyond the cooling station develops a lower and more uniform surface compression stress pattern with lesser effect on the edge compression, which enables the glass sheet to have a break pattern that approximates that of FIG. 2 rather than FIG. 1.

It is well known that when glass sheets are conveyed between opposite blasts of tempering medium, warpage may occur, particularly when glass sheets are conveyed with their lower major surfaces conveyed over a series of rotating conveyor rolls. It is conventional to adjust the comparative flow of tempering medium against the top and bottom surfaces to reduce glass sheet warpage. An auxiliary benefit of the present invention provides a novel technique for controlling the amount of difference of total flow of tempering medium against the opposite major surfaces which provides another parameter for use in controlling glass sheet warpage.

Figure 3:
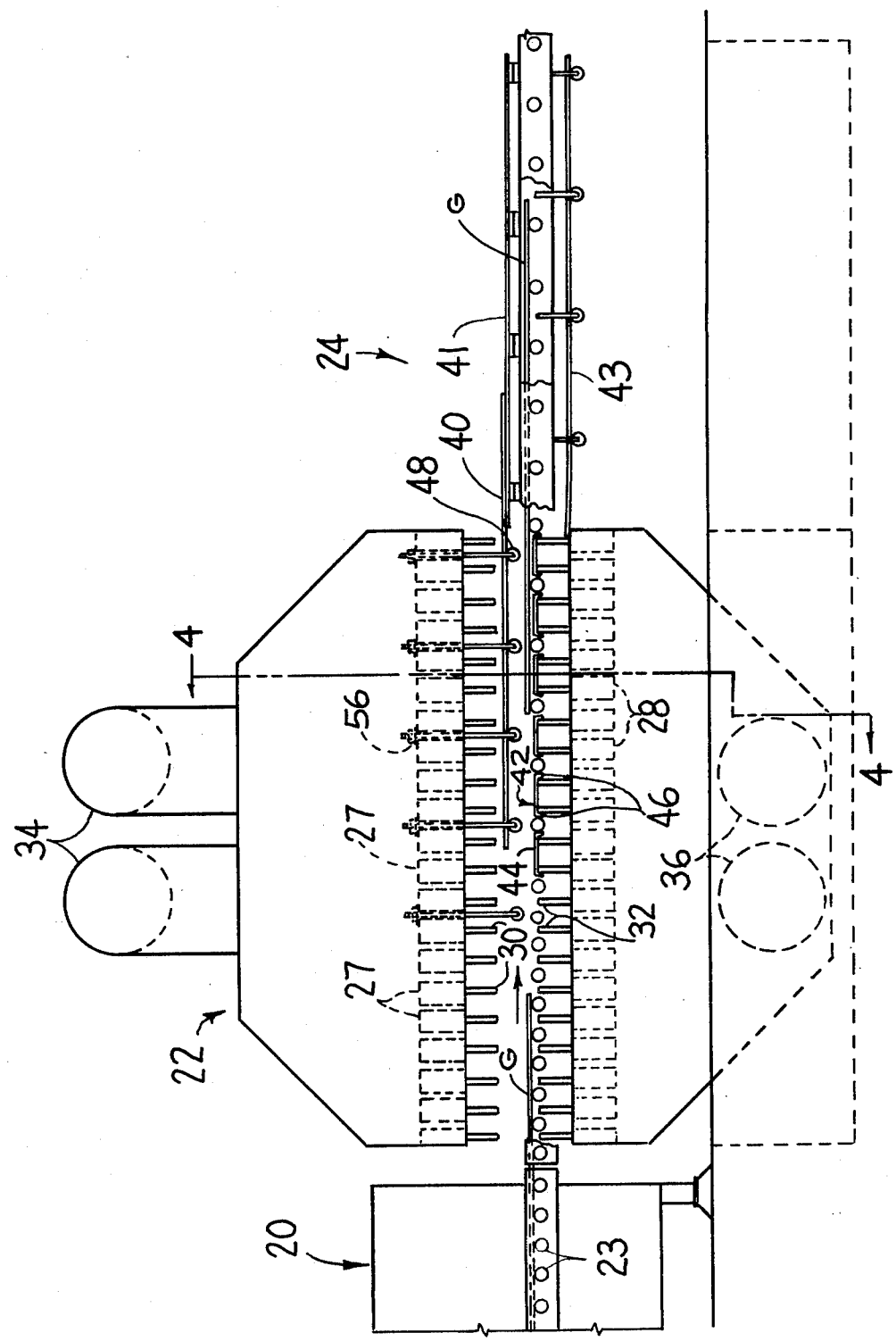
FIG. 3 is a longitudinal side elevation of a portion of glass sheet heat treatment apparatus showing how it is modified according to one embodiment of the present invention.
Figure 4:
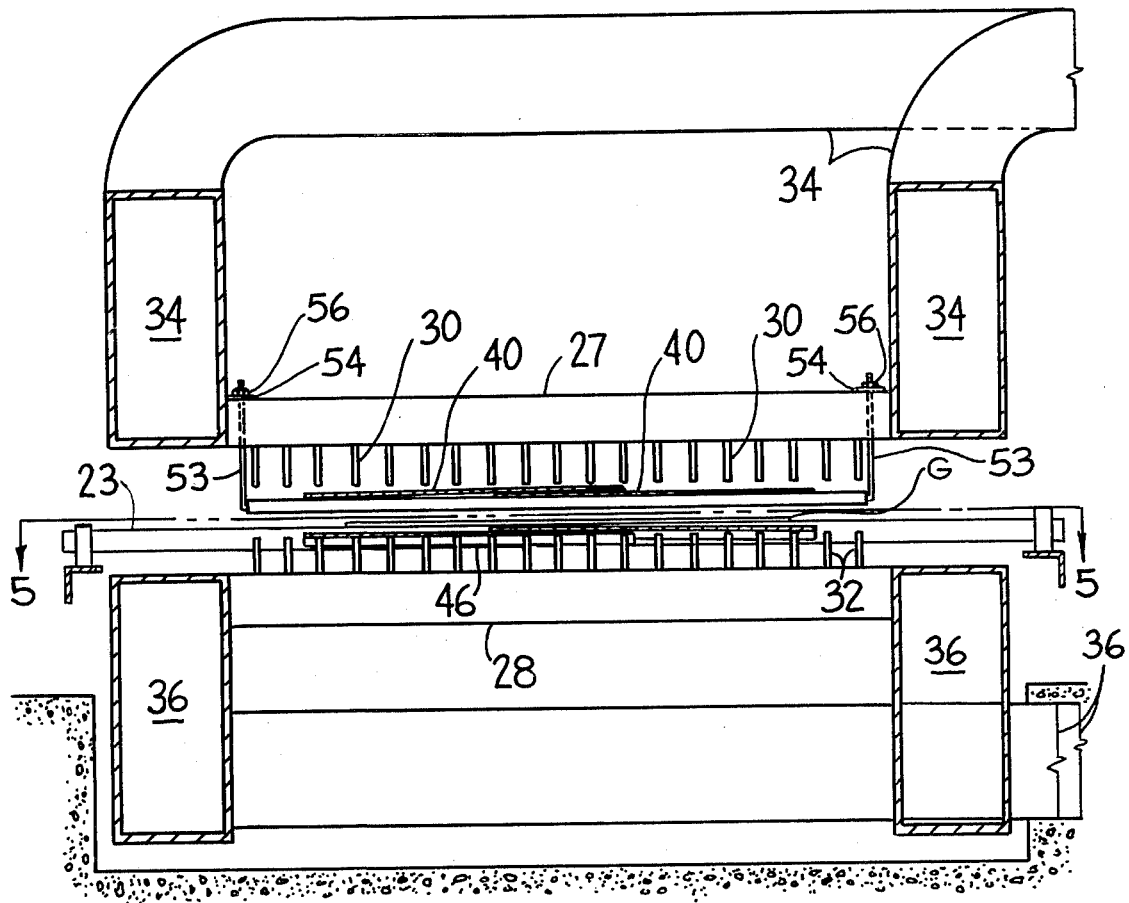
FIG. 4 is a taken along the lines 4—4 of a portion of the apparatus depicted in FIG. 3.
Figure 9:
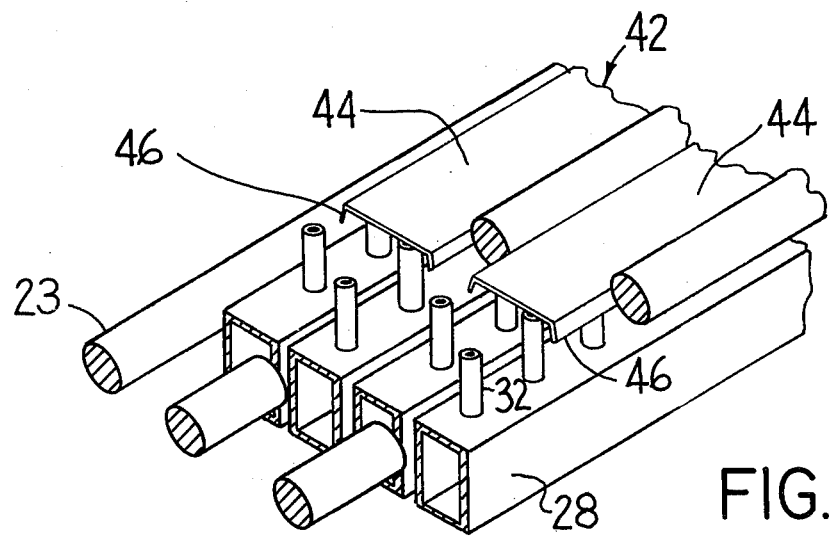
FIG. 9 is a perspective view similar to that of FIG. 8, showing how lower baffle means is supported to form a substantially continuous lower wall for apparatus according to the present invention.

In FIG. 3, the lower wall formed by the lower baffle means 42 and 43 is shown extending upstream beyond the upstream edge of the upper wall formed by the upper baffle means 40 and 41. Thus, the additional cooling of the upper major surface while the lower major surface faces the upstream end portion of the lower wall may be used to compensate for any warpage that may be imparted from simultaneous exposure to the opposite flows of tempering medium upstream of the walls. It is equally within the ambit of this invention to locate the upstream edge of the upper wall upstream of the upstream edge of the lower wall if required by the direction of warpage, thereby providing a configuration opposite that depicted in FIG. 3.

It is not necessary that the upstream edges of the upper and lower walls be longitudinally offset from one another. They can be aligned with each other as depicted in the alternative embodiment of FIG. 6. It is understood, however, that a combination of adjusting the relative upward and downward flow of tempering medium and alignment or misalignment of the upstream edges of the upper and lower walls can be used to minimize warpage while modifying the operation of an existing glass sheet tempering or heat-strengthening line to develop the desired surface stress pattern that reduces the tendency of the treated glass sheet to develop discrete areas of breakage likely to fall out of the supported edge portion of the sheet when the latter is installed.

The drawings show the upper baffle plates 40 or 64 spaced a slight distance below the openings of the upper nozzles 30. However, the externally threaded shafts 53 may be adjusted to bring the upper baffle plates 40 or 64 into substantially abutting relation against the openings or upper nozzles 30 according to the present invention.

A typical apparatus for heat strengthening glass sheets comprises 12 rows of transversely extending slot nozzles, each having an opening 3/16 inch (4.6 mm) wide and spaced 6 inches (15.24 cm) in the direction of glass sheet travel in the upstream portion of the cooling station. Four pairs of rows of pipe nozzles, each having a diameter of 0.5 inch (1.27 cm) spaced transversely across each row 1.5 inch (3.81 cm) apart with the rows of each pair spaced 2 inches (5.08 cm) apart and the pairs of rows separated 4 inches (10.16 cm) apart to receive conveyor rolls 6 inches (15.24 cm) apart (conforming to the space between the conveyor rolls between the slot nozzles) are located in the downstream portion of the cooling station. The nozzles are arranged in upper and lower sets that are the mirror image of each other. The apparatus was originally tried without any baffle means forming walls interposed between the nozzle openings and the major glass sheet surfaces with the nozzles set at a distance of 1⅝ inches (4.13 cm) from the adjacent glass sheet major surface and air blasted through the nozzles at a pressure of 0.5 inch (1.27 cm) water column against the top and bottom major surfaces. However, panels 73 inches (185 cm) wide by 97 inches (246 cm) long so treated developed break patterns similar to the one illustrated in FIG. 1.

Acceptable break patterns for a commercial group of panels were obtained by covering the last eleven rows of upper nozzles and the last ten rows of lower nozzles with baffle means that provided continuous walls overlapping both side edges of the glass sheets treated. Sheet metal about 1/32 inch (0.8 mm) thick was used as the baffle means. In order to provide space to insert the baffle means between the nozzles and the glass, and also to provide lesser cooling effect on the glass, the upper and lower nozzles were separated to provide spaces between each nozzle end and its adjacent major glass surface of 2 to 2⅛ inches (5.1 to 5.4 cm). In addition, after much experimentation with pressure adjustment, and with different baffle locations, acceptable results were obtained with an air pressure of 0.13 inch (3.3 mm) water column applied against the upper major glass surface and 0.35 inch (8.9 mm) water column applied against the lower major glass surface and the baffles arranged to provide continuous walls covering the last eleven rows of upper nozzles and last ten rows of lower nozzles.

The following table compares compression stress readings and acceptability of break pattern with natural cooling and with the forced cooling pattern both before and after the changes were made in the processing of float glass panels. Edge compression stress was measured at the center of each dimension using a quartz wedge and surface compression stresses were measured using a differential surface refractometer described in ISA Transactions, Volume 4, No. 4, October 1965, at a distance of about ½ inch (1.27 cm) inward from the points of edge stress measurement, which is referred to as "near" the corresponding edge.

TABLE I

|  | BEFORE CHANGE | With Natural Cooling | AFTER CHANGE First Commercial Production | AFTER CHANGE Second Commercial Production |
|---|---|---|---|---|
| Leading Edge[1] Compression Stress (PSI) | 11,200 | 7,000 | 12,200 | 10,300 |
| Trailing Edge[2] Compression Stress (PSI) | 7,000 | 4,400 | 9,600 | 8,700 |
| One Side Edge[3] Compression Stress | 6,000 | — | 7,500 | 6,600 |
| Other Side Edge[4] Compression Stress | 5,500 | — | 9,000 | 8,300 |
| Surface Compression Stress Near Edge[1] | 3,100 | — | 2,800 | 3,100 |
| Surface Compression Stress Near Edge[2] | 3,100 | — | 2,500 | 2,200 |
| Surface Compression Stress Near Edge[3] | 2,600 | — | 2,600 | 2,600 |
| Surface Compression Stress Near Edge[4] | 2,600 | — | 2,700 | 2,900 |
| Surface Compression Stress at Center | 4,100 | 4,100 | 2,000 | 1,900 |
| Break Pattern | Like FIG. 1 (unacceptable) | Like FIG. 1 (unacceptable) | Like FIG. 2 (acceptable) | Like FIG. 2 (acceptable) |

During the experimental program that led to the present invention, various techniques were employed to develop a reduced compression stress in the hopes of attaining a break pattern which would allow the glass sheet to remain as a unitary sheet within an installation frame despite breakage. Since glass sheets are normally installed with their edge portions covered by the installation frame and their exposed margin is spaced about ½ inch (1 to 2 cm) inward of the glass sheet edge, surface damage to the installed sheet is most likely to occur in the portion of the installed glass sheet that is either aligned with or slightly inside the inner edge of an installation frame.

Furthermore, the portion of an installed glass sheet aligned with the inner edge of the installation frame forms a boundary line between the outer edge portion that is shielded from direct exposure to radiant heat due to sunshine and the portion immediately inward of said boundary line which is directly exposed to said radiant heat. The region adjacent said boundary line thus develops a steep thermal gradient, which is accompanied by thermal stress likely to cause glass breaks to originate.

To simulate actual service conditions, a metal punch was applied to a major surface of a test panel mid-way of the longer dimension and about ½ inch inward of the edge of each tested sheet to simulate surface damage likely to induce a break pattern. A further step taken to induce a break pattern was to heat the geometrical center of the sheet to a temperature about 80° F. (45° C.) hotter than the edge so that a thermal gradient approximating the worst conditions expected for the window in use in a building was obtained during the test program. Of course, many of the tests enumerated hereafter resulted in sheets breaking before the break could be induced artificially by applying the metal punch.

The first test panels 73 inches (185 cm) wide and 97 inches (246 cm) long were heat strengthened using the conventional heat-strengthening technique in which glass sheets were heated to a temperature of 1180°-1220° F. (640°-660° C.) and then passed between upper and lower nozzles that directed air blasts against the upper and lower major surfaces of the glass sheets while the latter were conveyed with their lower major surfaces supported on rotating conveyor rolls disposed between adjacent transversely extending plenum chambers. The glass sheets successfully produced broke into many particles discrete from the edge portion of the sheet supported in an installation frame. A typical break pattern is shown in FIG. 1.

Glass test panels heated as the first group but cooled at a slower rate, including sheets cooled at a "natural" rate of cooling without any blasts of air through the tempering nozzles broke into many pieces including areas discrete from the edge portion supported in an installation frame. Furthermore, glass test panels subjected to natural cooling warped.

In another series of tests, test panels were heated as in the first and second groups and a series of upper baffles and a series of lower baffles were arranged to face the side edge portions of the moving glass sheets beyond the upstream portion of the cooling station where the latter were subjected to forced cooling over their entire major surfaces. These latter panels were fully exposed in their transverse central portions only to additional forced cooling while the cooling rates along the side edges were inhibited. Such panels broke into separate fragments during their processing and could not be used as installed windows.

Another group of test panels was treated by first heating each panel in a manner similar to the previous groups of panels followed by forced cooling over the entire major surfaces of the panels followed by further cooling with the transverse center portion only facing upper and lower baffles while the side portions of the major surfaces were fully exposed to additional forced cooling. Glass breakage developed during the subsequent cooling, handling and storage of test panels in this group.

The only arrangements that produced panels having acceptable break patterns were those where the glass sheets, after passing between nozzles that force cooled the glass, were then conveyed between continuous walls that extended beyond the opposite side edges of the moving glass sheets to face the entire extent of the upper and lower major glass sheet surfaces while the edge surfaces of the glass sheets faced the space between the walls. Preferably, the thickness of the space was no more than about 4½ inches (11.5 cm).

A study of the compressive stress pattern of Table I shows that a more uniform surface compression stress pattern from the geometric center of the sheet to the portion of the sheet aligned with the inner edge of the installation frame together with a high edge compression stress seemed to be correlated with an acceptable break pattern in the resulting panel.

The form of the invention shown and described in this specification represents an illustrative preferred embodiment and a variation thereof. It is understood that various other changes may be made without departing from the gist of the invention as defined by the claimed subject matter that follows.

We claim:

1. Apparatus for heat-strengthening glass sheets, particularly those having a shorter dimension of at least two feet (60 cm) so that the resulting heat-strengthened glass sheet when installed in a building is retained in a window frame when fractured rather than developing a break pattern that causes pieces to separate from the remainder of the sheet when breakage occurs, said apparatus comprising a tunnel-type furnace and a glass sheet cooling station arranged in end to end relation, means for conveying a series of glass sheets along an essentially horizontal path through said furnace and said cooling station, said cooling station comprising a set of nozzles disposed on each side of said path along the length of said cooling station and baffle means disposed between a downstream portion only of each of said sets of nozzles and said path to provide essentially continuous walls extending transversely of said path beyond the lateral edges of glass sheets moving between said walls longitudinally of a downstream portion of said cooling station.

2. Apparatus as in claim 1, wherein said baffle means comprises at least two baffle plates mounted in side-by-side relation to one another and adjustable in position to overlap one another to adjust the length and/or width of said essentially continuous walls relative to the extent of said cooling station.

3. Apparatus as in claim 2, wherein said baffle means comprises a set of individual upper baffle plates, each having a first dimension equal to a fraction of the width dimension of said path, the total width dimension of said upper baffle plates exceeding the width of said glass sheet, and a second dimension equal to a portion of the length of said cooling station, said nozzles comprising an upper set located above said path and a lower set located below said path, means for supporting each of said upper baffle plates in sliding relation between said upper set and said path, and means for vertically adjusting the position of said upper baffle plates relative to said upper set of nozzles to adjust the vertical position of a substantially continuous upper wall adjacent to said upper set of nozzles.

4. Apparatus as in claim 3, wherein said conveying means comprises a plurality of horizontally disposed, rotatable rolls spaced longitudinally of said path, and said lower set of nozzles are interposed between adjacent of said rolls, and channel shaped members resting on said lower set of nozzles in the downstream portion only of said cooling station and of sufficient size to extend from beyond one side edge of said glass sheet to beyond the other side edge of said glass sheet and substantially the entire distance between adjacent rolls to provide a lower wall wider than said glass sheet.

5. Apparatus as in claim 4, wherein said walls comprise an upper of said walls having an upstream edge longitudinally offset from the upstream edge of a lower of said walls.

6. A method of fabricating a heat-strengthened glass sheet having a break pattern on fracture that permits the fractured glass sheet to remain within an installation frame comprising heating said sheet to a temperature sufficient for tempering, force cooling said heated glass sheet sufficiently to develop a temperature gradient from its major surfaces to the center of its thickness that is steeper than the temperature gradient produced by natural cooling, and before the glass sheet cools to the strain point at the center of its thickness, discontinuing said force cooling and retarding the rate of glass sheet cooling at the major surfaces to a rate less than the rate of cooling the edge surfaces of said glass sheet by supporting said glass sheet immediately after said force cooling with its major surfaces facing continuous walls closely spaced relative to said major surfaces while the edge surfaces face the space between said walls until said sheet develops a more uniform surface compression stress pattern over the entire extent of said glass sheet within an edge portion that is relatively highly stressed in compression.

7. A method as in claim 6, wherein said glass sheet is conveyed in an essentially horizontal path and supported in an essentially horizontal plane while rapidly cooled by passing said sheet between opposed arrays of upper and lower nozzles applying tempering medium against the upper and lower major surfaces of the conveyed glass sheet and then cooling said sheet at a retarded rate by passing said sheet between upper and lower continuous walls facing and approximately parallel to the opposite major surfaces thereof throughout their entire extent and extending transversely beyond the opposite side edges of the glass sheet to provide a narrow space for conveying said glass sheet between said upper and lower walls while the edge surface of the glass sheet faces said narrow space.

8. A method as in claim 7, wherein the opposite surfaces of the glass sheet are directly exposed to an equal number of blasts of tempering medium on each side at opposing flow rates adjusted relative to one another to minimize warping of said sheet.

9. A method as in claim 7, wherein said sheet has its opposite major surfaces exposed to a different number of blasts of tempering medium, the difference in number between the opposite major surfaces being coordinated with the flow of tempering medium against the opposite major surfaces to minimize warpage of said sheet.

* * * * *